(12) United States Patent
Uno et al.

(10) Patent No.: US 7,368,387 B2
(45) Date of Patent: May 6, 2008

(54) POLISHING COMPOSITION AND POLISHING METHOD

(75) Inventors: Takanori Uno, Gifu (JP); Hiroyasu Sugiyama, Aichi (JP); Toshiki Owaki, Aichi (JP)

(73) Assignee: Fujimi Incorporated, Nishikasugai-gun, Aichi (JP)

( * ) Notice: Subject to any disclaimer, the term of this patent is extended or adjusted under 35 U.S.C. 154(b) by 0 days.

(21) Appl. No.: 11/020,545

(22) Filed: Dec. 22, 2004

(65) Prior Publication Data

US 2005/0139803 A1   Jun. 30, 2005

(30) Foreign Application Priority Data

Dec. 25, 2003   (JP) .............................. 2003-431615

(51) Int. Cl.
*H01L 21/311* (2006.01)

(52) U.S. Cl. .................. 438/692; 438/693; 216/88; 216/89; 252/79.1; 252/79.2; 51/307; 51/308

(58) Field of Classification Search ................ 438/692, 438/693; 216/88, 89; 252/79.1, 79.2; 51/307, 51/308
See application file for complete search history.

(56) References Cited

U.S. PATENT DOCUMENTS

| | | | |
|---|---|---|---|
| 4,956,015 A | 9/1990 | Okajima et al. ................ 106/3 |
| 5,366,542 A | 11/1994 | Yamada et al. ................ 106/3 |
| 6,117,220 A | 9/2000 | Kodama ........................ 106/3 |
| 6,193,790 B1 | 2/2001 | Tani ............................... 106/3 |
| 6,293,848 B1 | 9/2001 | Fang et al. ..................... 451/36 |
| 6,319,096 B1 | 11/2001 | Mueller et al. ................ 451/41 |
| 6,423,125 B1 | 7/2002 | Ishibashi et al. ................ 106/3 |
| 6,527,817 B1 | 3/2003 | Fang et al. .................... 51/307 |
| 6,527,818 B2 * | 3/2003 | Hattori et al. ................ 51/308 |
| 6,645,051 B2 | 11/2003 | Sugiyama et al. ............ 451/41 |
| 6,716,755 B2 | 4/2004 | Fang et al. .................. 438/690 |
| 6,740,590 B1 * | 5/2004 | Yano et al. .................. 438/692 |
| 2002/0037642 A1 | 3/2002 | Wake et al. ................. 438/638 |
| 2004/0157535 A1 | 8/2004 | Chaneyalew et al. ......... 451/41 |

FOREIGN PATENT DOCUMENTS

| JP | 2-84485 | 3/1990 |
|---|---|---|
| JP | 2003-133266 | 5/2003 |
| JP | 2003-170349 | 6/2003 |
| JP | 2003-218071 | 7/2003 |
| JP | 2003-238942 | 8/2003 |

* cited by examiner

*Primary Examiner*—Binh X. Tran
*Assistant Examiner*—Maki Angadi
(74) *Attorney, Agent, or Firm*—Vidas, Arrett & Steinkraus

(57) ABSTRACT

A polishing composition includes fumed alumina, alumina other than fumed alumina, colloidal silica, a first organic acid, a second organic acid, an oxidizing agent, and water. When the second organic acid is citric acid, the first organic acid is preferably malic acid, while when the second organic acid is malic acid, the first organic acid is preferably citric acid. When the second organic acid is succinic acid, iminodiacetic acid, itaconic acid, maleic acid, malonic acid, crotonic acid, gluconic acid, glycolic acid, lactic acid, or mandelic acid, the first organic acid is preferably either citric acid or malic acid. The polishing composition can be suitably used for polishing the surface of a substrate for a magnetic disk.

20 Claims, No Drawings

POLISHING COMPOSITION AND POLISHING METHOD

BACKGROUND OF THE INVENTION

The present invention relates to a polishing composition used to polish an object such as a substrate for a magnetic disk, and a method for polishing an object using such a polishing composition.

A substrate for a magnetic disk is usually manufactured through a plurality of polishing steps. In general, in a first polishing step, a polishing composition containing alumina, an organic acid, and water is used (see, for example, Japanese Laid-Open Patent Publication Nos. 2-84485 and 2003-170349). For the purpose of obtaining a substrate having few surface defects such as pits, it is preferable that the particle size of alumina contained in the polishing composition be as small as possible. However, most polishing compositions containing alumina having small particle sizes are incapable of rapidly polishing a substrate. On the other hand, as a magnetic disk becomes higher in capacity higher flatness is demanded for a substrate for the magnet disk. One of the factors causing degradation in the flatness of a substrate is surface defects; a substrate abundant in defects is poor in flatness.

SUMMARY OF THE INVENTION

Accordingly, it is an objective of the present invention to provide a polishing composition suitable for use in polishing the surface of a substrate for a magnetic disk, and to provide a polishing method using such a polishing composition.

To achieve the foregoing and other objectives and in accordance with the purpose of the present invention, a polishing composition is provided. The polishing composition contains fumed alumina, alumina other than fumed alumina, colloidal silica, a first organic acid, a second organic acid, an oxidizing agent, and water. The first organic acid is citric acid or malic acid.

The present invention also provides a method for polishing a substrate for a magnetic disk. The method includes preparing the above polishing composition and polishing the surface of the substrate using the prepared polishing composition.

Other aspects and advantages of the invention will become apparent from the following description, illustrating by way of example the principles of the invention.

DETAILED DESCRIPTION OF THE PREFERRED EMBODIMENTS

A first embodiment of the present invention will now be described.

A polishing composition according to a first embodiment consists of fumed alumina, alumina other than fumed alumina, colloidal silica, either citric acid or malic acid (a first organic acid), an organic acid other than citric acid and malic acid (a second organic acid), an oxidizing agent, and water.

The fumed alumina assumes a role as an abrasive for mechanically polishing an object. If the mean primary particle size of fumed alumina is too small, the polishing composition sometimes does not have sufficient polishing ability. Accordingly, the mean primary particle size of fumed alumina is preferably 5 nm or more, and more preferably 10 nm or more. On the other hand, when the mean primary particle size of fumed alumina is too large, precipitates are sometimes formed in the polishing composition. Accordingly, the mean primary particle size of fumed alumina is preferably 0.5 µm or less, and more preferably 0.1 µm or less. The mean primary particle size of fumed alumina is derived from, for example, the specific surface area of fumed alumina measured by means of the BET method.

If the mean secondary particle size of fumed alumina is too large, precipitates are sometimes formed in the-polishing composition. Accordingly, the mean secondary particle size of fumed alumina is preferably. 1.5 µm or less. The mean secondary particle size of fumed alumina is measured, for example, by means of the laser diffraction scattering method.

If the content of fumed alumina in the polishing composition is too small, the polishing composition sometimes does not have sufficient polishing ability. Accordingly, the content of fumed alumina in the polishing composition is preferably 0.02% by weight or more, and more preferably 0.06% by weight or more, and most preferably 0.1% by weight or more. On the other hand, if the content of fumed alumina in the polishing composition is too large, handling of the polishing composition is sometimes difficult because the viscosity of the polishing composition is too high. Accordingly, the content of fumed alumina in the polishing composition is preferably 3% by weight or less, more preferably 2% by weight or less, and most preferably 0.6% by weight or less.

Similarly to the fumed alumina, alumina other than fumed alumina in the polishing composition assumes a role as an abrasive for mechanically polishing an object. Alumina having a mean particle size of 0.1 µm or more has high polishing ability, and alumina having a mean particle size of 0.2 µm or more has particularly high polishing ability. Accordingly, the mean particle size of alumina other than fumed alumina is preferably 0.1 µm or more, and more preferably 0.2 µm or more.

On the other hand, when the mean particle size of alumina other than fumed alumina exceeds 1.0 µm, roughness may be enhanced and scratches may be formed on the surface of an object polished by use of the polishing composition; when the mean particle size of alumina other than fumed alumina exceeds 1.2 µm, such adverse effects occur frequently. When the mean particle size of alumina other than fumed alumina is 0.8 µm or less, the surface conditions of an object polished by use of the polishing composition is particularly satisfactory. Accordingly, the mean particle size of alumina other than fumed alumina is preferably 1.2 µm or less, more preferably 1.0 µm or less, and most preferably 0.8 µm or less.

When the content of alumina other than fumed alumina in the polishing composition is too small, the polishing composition sometimes does not have sufficient polishing ability. Accordingly, the content of alumina other than fumed alumina in the polishing composition is preferably 0.01% by weight or more, more preferably 0.1% by weight or more, and most preferably 0.2% by weight or more. On the other hand, when the content of alumina other than fumed alumina in the polishing composition is too large, sometimes handling of the polishing composition is difficult because the viscosity of the polishing composition is too high. Accordingly, the content of alumina other than fumed alumina in the polishing composition is preferably 8% by weight or less, more preferably 7% by weight or less, and most preferably 5% by weight or less.

The colloidal silica also assumes a role as an abrasive for mechanically polishing an object. When the mean particle size of colloidal silica is less than 10 nm, pits are sometimes generated on the surface of an object that has been polished by use of the polishing composition; colloidal silica having a mean particle size of 15 nm or more has high polishing ability. Accordingly, the mean particle size of colloidal silica is preferably 10 nm or more, and more preferably 15 nm or more.

On the other hand, colloidal silica having a mean particle size of 200 nm or less is easily available, and colloidal silica having a mean particle size of 100 nm or less has satisfactory stability. Accordingly, the mean particle size of colloidal silica is preferably 200 nm or less, and more preferably 100 nm or less.

When the content of colloidal silica in the polishing composition is too small, the polishing composition sometimes does not have sufficient polishing ability. Accordingly, the content of colloidal silica in the polishing composition is preferably 0.2% by weight or more, more preferably 0.6% by weight or more, and most preferably 1% by weight or more. On the other hand, when the content of colloidal silica in the polishing composition is too large, handling of the polishing composition is sometimes difficult because the viscosity of the polishing composition is too high. Accordingly, the content of colloidal silica in the polishing composition is preferably 14% by weight or less, more preferably 12% by weight or less, and most preferably 10% by weight or less.

The colloidal silica may be monodisperse, and may also include associated particles having high aspect ratios.

The first and second organic acids have the function of promoting the polishing by the abrasive of an object through the chemical action of these acids on the object. The second organic acid, namely, an organic acid other than citric acid and malic acid, is, for example, succinic acid, iminodiacetic acid, itaconic acid, maleic acid, malonic acid, crotonic acid, gluconic acid, glycolic acid, lactic acid, or mandelic acid, preferably succinic acid, iminodiacetic acid, itaconic acid, maleic acid, or malonic acid, and more preferably succinic acid. This is because succinic acid, iminodiacetic acid, itaconic acid, maleic acid and malonic acid are high in ability to promote the polishing by an abrasive of the object, and succinic acid is particularly high in ability to promote the polishing by an abrasive of the object.

When the content of the first organic acid in the polishing composition is too small, the polishing composition sometimes does not have sufficient polishing ability Accordingly, the content of the first organic acid in the polishing composition is preferably 0.02% by weight.or more, more preferably 0.1% by weight or more, and most preferably 0.2% by weight or more. On the other hand, when the content of the first organic acid in the polishing composition is too large, the polishing ability of the polishing composition is sometimes saturated uneconomically, and the stability of colloidal silica in the polishing composition is sometimes impaired. Accordingly, the content of the first organic acid in the polishing composition is preferably 3% by weight or less, more preferably 2% by weight or less, and most preferably 1.4% by weight or less.

When the content of the second organic acid in the polishing composition is too small, the polishing composition sometimes does not have sufficient polishing ability. Accordingly, the content of the second organic acid in the polishing composition is preferably 0.002% by weight or more, more preferably 0.02% by weight or more, and most preferably 0.1% by weight or more. On the other hand, when the content of the second organic acid in the polishing composition is too large, the polishing ability of the polishing composition is sometimes saturated uneconomically, and the stability of colloidal silica in the polishing composition is sometimes impaired. Accordingly, the content of the second organic acid in the polishing composition is preferably 2% by weight or less, more preferably 1% by weight or less, and most preferably 0.6% by weight or less.

The oxidizing agent has the function of oxidizing an object to promote the polishing by an abrasive of the object. Specific examples of the oxidizing agent include hydrogen peroxide, iron nitrate, aluminum nitrate, peroxodisulfuric acid, periodic acid, perchloric acid, and hypochlorous acid. Among these oxidizing agents, hydrogen peroxide and periodic acid are preferable, and hydrogen peroxide is more preferable. This is because hydrogen peroxide and periodic acid are high in ability to promote the polishing by an abrasive of the object, and hydrogen peroxide is easy to handle.

When the content of the oxidizing agent in the polishing composition is too small, the polishing composition sometimes does not have sufficient polishing ability. Accordingly, the content of the oxidizing agent in the polishing composition is preferably 0.02% by weight or more, more preferably 0.2% by weight or more, and most preferably 0.5% by weight or more. On the other hand, when the content of the oxidizing agent in the polishing composition is too large, the polishing ability of the polishing composition is sometimes saturated uneconomically, the stability of the polishing composition is sometimes impaired, and handling of the polishing composition is sometimes difficult. Accordingly, the content of the oxidizing agent in the polishing composition is preferably 12% by weight or less, more preferably 10% by weight or less, and most preferably 8% by weight or less.

The above described water assumes a role as a dispersion medium for dispersing fumed alumina, alumina other than fumed alumina and colloidal silica, and also a role as a solvent for dissolving the organic acids and the oxidizing agent. It is preferable that the water contains impurities as small as possible. The preferable examples of the water include ion-exchanged water, pure water, ultrapure water, and distilled water.

A second embodiment of the present invention will now be described.

A polishing composition according to a second embodiment consists of fumed alumina, alumina other than fumed alumina, colloidal silica, citric acid (a first organic acid), malic acid (a second organic acid), an oxidizing agent, and water.

When the content of citric acid in the polishing composition according to the second embodiment is too small, the polishing composition sometimes does not have sufficient polishing ability. Accordingly, the content of citric acid in the polishing composition is preferably 0.02% by weight or more, more preferably 0.1% by weight or more, and most preferably 0.2% by weight or more. On the other hand, when the content of citric acid in the polishing composition is too large, the polishing ability of the polishing composition is sometimes saturated uneconomically, and the stability of the colloidal silica in the polishing composition is sometimes impaired. Accordingly, the content of citric acid in the polishing composition is preferably 3% by weight or less, more preferably 2% by weight or less, and most preferably 1.4% by weight or less.

When the content of malic acid in the polishing composition according to the second embodiment is too small, the polishing composition sometimes does not have sufficient polishing ability. Accordingly, the content of malic acid in the polishing composition is preferably 0.02% by weight or more, more preferably 0.1% by weight or more, and most preferably 0.2% by weight or more. On the other hand, when the content of malic acid in the polishing composition is too large, the polishing ability of the polishing composition is sometimes saturated uneconomically, and the stability of colloidal silica in the polishing composition is sometimes impaired. Accordingly, the content of malic acid in the polishing composition is preferably 3% by weight or less, more preferably 2% by weight or less, and most preferably 1.4% by weight or less.

The polishing compositions according to the first and second embodiments are used for polishing, for example, the surface of a substrate for a magnetic disk. It is preferable that the polishing compositions are used in a first polishing step of a plurality of polishing steps carried out generally in the process for manufacturing the substrate.

When an object is polished by use of polishing compositions according to the first and second embodiments, rapid polishing of the object is made possible even when the particle size of alumina other than fumed alumina is small; additionally, in the object after being subjected to polishing, surface defects such as pits are reduced. For these facts, the following two main reasons are possible.

One of the main reasons is the possibility such that in the polishing compositions, colloidal silica is electrostatically bonded to the surface of fumed alumina and the surface of alumina other than fumed alumina, and consequently the polishing ability of fumed alumina and the polishing ability of alumina other than fumed alumina are appropriately weakened. When an object is polished, it is inferred that fumed alumina and alumina other than fumed alumina respectively bonded to colloidal silica, polish the object which is embrittled by the action of the organic acids and the oxidizing agent.

The other of the main reasons is the possibility such that the polishing ascribable to fumed alumina bonded to colloidal silica and the polishing ascribable to alumina other than fumed alumina bonded to colloidal silica are combined; the particle size of fumed alumina is relatively small so that the former polishing is to be relatively fine, while the particle size of alumina other than fumed alumina is relatively large so that the latter polishing is to be relatively rough.

It should be apparent to those skilled in the art that the present invention may be embodied in many other specific forms without departing from the spirit or scope of the invention. Particularly, it should be understood that the invention may be embodied in the following forms.

A polishing composition according to the first embodiment may include two or more organic acids as the organic acid other than citric acid and malic acid.

A polishing composition according to the second embodiment may further include organic acids other than citric acid and malic acid.

Polishing compositions according to the first and second embodiments each may further include known additives such as surfactants, chelating agents, antiseptic agents and the like generally included in conventional polishing compositions.

Polishing compositions according to the first and second embodiments each may be transported or stored in a condition such that the polishing composition is divided into two or more parts each including at least one of the constituent components of the polishing composition. In this case, the polishing compositions each are prepared by mixing together two or more parts before the polishing composition is used for polishing.

Polishing compositions according to the first and second embodiments each may be prepared by diluting with water an undiluted solution prepared so as to include the components, other than water, contained in the polishing composition in relatively high concentrations. The content of fumed alumina in each of the undiluted solutions of the polishing compositions according to the first and second embodiments is preferably 0.01 to 5% by weight, more preferably 0.05 to 4% by weight, and most preferably 0.1 to 3% by weight. The content of alumina other than fumed alumina in each of the undiluted solutions of the polishing compositions according to the first and second embodiments is preferably 0.05 to 40% by weight, more preferably 0.5 to 35% by weight, and most preferably 1 to 25% by weight. The content of colloidal silica in each of the undiluted solutions of the polishing compositions according to the first and second embodiments is preferably 1 to 70% by weight, more preferably 3 to 60% by weight, and most preferably 5 to 50% by weight. The content of the first organic acid in the stock solution of the polishing composition according to the first embodiment is preferably. 0.1 to 15% by weight, more preferably 0.5 to 10% by weight, and most preferably 1 to 7% by weight. The content of.the second organic acid in the stock solution of the polishing composition according to the first embodiment is preferably 0.01 to 10% by weight, more preferably 0.1 to 5% by weight, and most preferably 0.5 to 3% by weight. The content of the oxidizing agent in each of the stock solutions of the polishing compositions according to the first and second embodiments is preferably 0.1 to 10% by weight, more preferably 1 to 8.5% by weight, and most preferably 2.5 to 7.5% by weight.

Polishing compositions according to the first and second embodiments may be used for polishing an object other than a substrate for a magnetic disk.

Examples and Comparative Examples of the present invention will now be described.

An abrasive and organic acid were mixed in water, and an oxidizing agent was mixed, as required, to prepare undiluted solutions of polishing compositions. Then, each of the undiluted solutions was diluted by a factor of five with water to prepare a polishing composition. The abrasive, organic acid, and oxidizing agent included in each of the undiluted solutions are as shown in detail in Tables 1 to 3. The "fumed alumina" in Tables.1 to 3 denotes fumed alumina having a mean primary particle size of 13 nm and a mean secondary particle size of 1 μm. The "alumina" in Table 1 denotes alumina other than fumed alumina, the mean particle size thereof being 0.6 μm The "alumina" in Table 2 denotes alumina other than fumed alumina, the mean particle size thereof being 0.8 μm. The "alumina" in Table 3 denotes alumina other than fumed alumina, the mean particle size thereof being 0.3 μm. The "colloidal silica" in Tables 1 to 3 denotes colloidal silica having a mean particle size of 40 nm.

Polishing Conditions

Polishing apparatus: Double side polishing machine, "9.5B-5P," manufactured by System Seiko Co., Ltd.

Polishing pad: Polyurethane pad, "CR200" manufactured by Kanebo, Ltd.

Polish object: 15 Sheets of substrates for magnetic disks of 3.5 inches (about 95 mm) in diameter each formed by electroless nickel phosphorus plating of the surface of a blank material made of an aluminum alloy Polishing load: 10 kPa Rotation number of the upper platen: 24 rpm Rotation number of the lower platen: 16 rpm Feeding rate of the polishing composition: 150 mL/min Stock removal amount: a thickness of 2 μm in total involving both surfaces of each substrate The column entitled "stock removal rate" in Tables 1 to 3 shows the stock removal rate derived from the following calculation formula when an object (a substrate for a magnetic disk) was polished by use of the respective polishing compositions under the above described polishing conditions.

$$R_P = (W_{S1} - W_{S2})/(A_S \times D_S \times T_P \times 10^{-4})$$

In the above calculation formula, $R_P$ denotes the stock removal rate (μm/min), $W_{S1}$ denotes the weight (g) of a substrate prior to polishing, $W_{S2}$ denotes the weight (g) of the substrate after polishing, $A_S$ denotes the area (cm$^2$) of the surface of the substrate to be polished, $D_S$ denotes the density (g/cm$^3$) of the substrate, and $T_P$ denotes the polishing time (min).

The column entitled "pits" in Table 1 to 3 shows the result of the evaluation, based on the two grades of "good" (G) and "no good" (NG), of the number of pits observed on the surface of each of the objects polished under the above described polishing conditions by use of the respective polishing compositions.

The column entitled "microwaviness" in Table 1 to 3 shows the microwaviness magnitudes measured on the surface of each of the objects polished under the above described polishing conditions by use of the respective polishing compositions. The "hyphens ("–")" in the column entitled "microwaviness" in Tables 1 to 3 denote that no measurement was possible. The microwaviness magnitudes are the roughness values Ra measured by use of a non-contact surface profiler "MicroXAM" manufactured by Phase Shift Co with an objective lens having a magnification of 10 and with the measurement wavelengths of 80 to 450 μm. The microwaviness is a factor that degrades the flatness of a substrate, similarly to surface defects such as pits; a substrate large in microwaviness is poor in flatness.

TABLE 1

|  | Abrasive [weight percentage] | | Organic acid [weight percentage] | | Oxidizing agent [weight percentage] | | Stock removal rate [μm/min] | Pits | Micro-waviness [Å] |
|---|---|---|---|---|---|---|---|---|---|
| Ex. 1 | alumina | 15 | citric acid | 3 | hydrogen peroxide | 5 | 0.70 | G | 2.7 |
|  | colloidal silica | 10 | succinic acid | 1 | 31% aqueous solution | | | | |
|  | fumed alumina | 0.1 | | | | | | | |
| Ex. 2 | alumina | 15 | citric acid | 3 | hydrogen peroxide | 5 | 0.72 | G | 2.6 |
|  | colloidal silica | 10 | succinic acid | 1 | 31% aqueous solution | | | | |
|  | fumed alumina | 0.3 | | | | | | | |
| Ex. 3 | alumina | 15 | citric acid | 3 | hydrogen peroxide | 5 | 0.78 | G | 2.5 |
|  | colloidal silica | 10 | succinic acid | 1 | 31% aqueous solution | | | | |
|  | fumed alumina | 2 | | | | | | | |
| Ex. 4 | alumina | 15 | malic acid | 3 | hydrogen peroxide | 5 | 0.77 | G | 2.3 |
|  | colloidal silica | 10 | succinic acid | 1 | 31% aqueous solution | | | | |
|  | fumed alumina | 2 | | | | | | | |
| Ex. 5 | alumina | 15 | citric acid | 3 | hydrogen peroxide | 5 | 0.76 | G | 2.5 |
|  | colloidal silica | 10 | iminodiacetic acid | 1 | 31% aqueous solution | | | | |
|  | fumed alumina | 2 | | | | | | | |
| Ex. 6 | alumina | 15 | citric acid | 3 | hydrogen peroxide | 5 | 0.75 | G | 2.4 |
|  | colloidal silica | 10 | itaconic acid | 1 | 31% aqueous solution | | | | |
|  | fumed alumina | 2 | | | | | | | |
| Ex. 7 | alumina | 15 | citric acid | 3 | hydrogen peroxide | 5 | 0.74 | G | 2.4 |
|  | colloidal silica | 10 | glycolic acid | 1 | 31% aqueous solution | | | | |
|  | fumed alumina | 2 | | | | | | | |
| Ex. 8 | alumina | 15 | citric acid | 3 | hydrogen peroxide | 5 | 0.75 | G | 2.3 |
|  | colloidal silica | 10 | malic acid | 1 | 31% aqueous solution | | | | |
|  | fumed alumina | 2 | | | | | | | |
| Ex. 9 | alumina | 15 | citric acid | 1 | hydrogen peroxide | 5 | 0.70 | G | 2.4 |
|  | colloidal silica | 10 | malic acid | 3 | 31% aqueous solution | | | | |
|  | fumed alumina | 2 | | | | | | | |
| Ex. 10 | alumina | 15 | citric acid | 3 | iron nitrate | 5 | 0.65 | G | 2.5 |
|  | colloidal silica | 10 | succinic acid | 1 | | | | | |
|  | fumed alumina | 2 | | | | | | | |
| Ex. 11 | alumina | 15 | citric acid | 3 | peroxydisulfuric acid | 5 | 0.64 | G | 2.5 |
|  | colloidal silica | 10 | succinic acid | 1 | | | | | |
|  | fumed alumina | 2 | | | | | | | |
| C. Ex. 1 | alumina | 15 | citric acid | 3 | hydrogen peroxide | 5 | 0.68 | G | 3.0 |
|  | colloidal silica | 10 | succinic acid | 1 | 31% aqueous solution | | | | |
| C. Ex. 2 | alumina | 15 | malic acid | 3 | hydrogen peroxide | 5 | 0.67 | G | 2.7 |
|  | colloidal silica | 10 | succinic acid | 1 | 31% aqueous solution | | | | |
| C. Ex. 3 | alumina | 15 | succinic acid | 1 | hydrogen peroxide | 5 | 0.55 | G | 2.3 |
|  | colloidal silica | 10 | | | 31% aqueous solution | | | | |
|  | fumed alumina | 2 | | | | | | | |
| C. Ex. 4 | alumina | 15 | citric acid | 3 | hydrogen peroxide | 5 | 0.25 | NG | — |
|  | fumed alumina | 2 | succinic acid | 1 | 31% aqueous solution | | | | |
| C. Ex. 5 | alumina | 15 | citric acid | 3 | hydrogen peroxide | 5 | 0.50 | G | 3.1 |
|  | colloidal silica | 10 | | | 31% aqueous solution | | | | |
|  | fumed alumina | 2 | | | | | | | |
| C. Ex. 6 | alumina | 15 | citric acid | 5 | hydrogen peroxide | 5 | 0.52 | G | 3.2 |
|  | colloidal silica | 10 | | | 31% aqueous solution | | | | |
|  | fumed alumina | 2 | | | | | | | |

TABLE 1-continued

|  | Abrasive [weight percentage] | | Organic acid [weight percentage] | | Oxidizing agent [weight percentage] | | Stock removal rate [μm/min] | Pits | Micro-waviness [Å] |
|---|---|---|---|---|---|---|---|---|---|
| C. Ex. 7 | alumina | 15 | citric acid | 3 | — |  | 0.63 | G | 2.5 |
|  | colloidal silica | 10 | succinic acid | 1 |  |  |  |  |  |
|  | fumed alumina | 2 |  |  |  |  |  |  |  |
| C. Ex. 8 | alumina | 15 | citric acid | 3 | hydrogen peroxide | 5 | 0.50 | G | 2.8 |
|  | colloidal silica | 10 | succinic acid | 1 | 31% aqueous solution |  |  |  |  |
|  | fumed silica | 2 |  |  |  |  |  |  |  |

TABLE 2

|  | Abrasive [weight percentage] | | Organic acid [weight percentage] | | Oxidizing agent [weight percentage] | | Stock removal rate [μm/min] | Pits | Micro-waviness [Å] |
|---|---|---|---|---|---|---|---|---|---|
| Ex. 12 | alumina | 15 | citric acid | 3 | hydrogen peroxide | 5 | 0.91 | G | 3.6 |
|  | colloidal silica | 10 | succinic acid | 1 | 31% aqueous solution |  |  |  |  |
|  | fumed alumina | 0.1 |  |  |  |  |  |  |  |
| Ex. 13 | alumina | 15 | citric acid | 3 | hydrogen peroxide | 5 | 0.94 | G | 3.6 |
|  | colloidal silica | 10 | succinic acid | 1 | 31% aqueous solution |  |  |  |  |
|  | fumed alumina | 0.3 |  |  |  |  |  |  |  |
| Ex. 14 | alumina | 15 | citric acid | 3 | hydrogen peroxide | 5 | 1.00 | G | 3.6 |
|  | colloidal silica | 10 | succinic acid | 1 | 31% aqueous solution |  |  |  |  |
|  | fumed alumina | 2 |  |  |  |  |  |  |  |
| Ex. 15 | alumina | 15 | malic acid | 3 | hydrogen peroxide | 5 | 0.99 | G | 3.3 |
|  | colloidal silica | 10 | succinic acid | 1 | 31% aqueous solution |  |  |  |  |
|  | fumed alumina | 2 |  |  |  |  |  |  |  |
| Ex. 16 | alumina | 15 | citric acid | 3 | hydrogen peroxide | 5 | 0.98 | G | 3.6 |
|  | colloidal silica | 10 | iminodiacetic acid | 1 | 31% aqueous solution |  |  |  |  |
|  | fumed alumina | 2 |  |  |  |  |  |  |  |
| Ex. 17 | alumina | 15 | citric acid | 3 | hydrogen peroxide | 5 | 0.97 | G | 3.6 |
|  | colloidal silica | 10 | itaconic acid | 1 | 31% aqueous solution |  |  |  |  |
|  | fumed alumina | 2 |  |  |  |  |  |  |  |
| Ex. 18 | alumina | 15 | citric acid | 3 | hydrogen peroxide | 5 | 0.98 | G | 3.6 |
|  | colloidal silica | 10 | glycolic acid | 1 | 31% aqueous solution |  |  |  |  |
|  | fumed alumina | 2 |  |  |  |  |  |  |  |
| Ex. 19 | alumina | 15 | citric acid | 3 | hydrogen peroxide | 5 | 0.96 | G | 3.5 |
|  | colloidal silica | 10 | malic acid | 1 | 31% aqueous solution |  |  |  |  |
|  | fumed alumina | 2 |  |  |  |  |  |  |  |
| Ex. 20 | alumina | 15 | citric acid | 1 | hydrogen peroxide | 5 | 0.92 | G | 3.5 |
|  | colloidal silica | 10 | malic acid | 3 | 31% aqueous solution |  |  |  |  |
|  | fumed alumina | 2 |  |  |  |  |  |  |  |
| Ex. 21 | alumina | 15 | citric acid | 3 | iron nitrate | 5 | 0.95 | G | 3.6 |
|  | colloidal silica | 10 | succinic acid | 1 |  |  |  |  |  |
|  | fumed alumina | 2 |  |  |  |  |  |  |  |
| Ex. 22 | alumina | 15 | citric acid | 3 | peroxydisulfuric acid | 5 | 0.96 | G | 3.6 |
|  | colloidal silica | 10 | succinic acid | 1 |  |  |  |  |  |
|  | fumed alumina | 2 |  |  |  |  |  |  |  |
| C. Ex. 9 | alumina | 15 | citric acid | 3 | hydrogen peroxide | 5 | 0.88 | G | 3.6 |
|  | colloidal silica | 10 | succinic acid | 1 | 31% aqueous solution |  |  |  |  |
| C. Ex. 10 | alumina | 15 | malic acid | 3 | hydrogen peroxide | 5 | 0.88 | G | 3.3 |
|  | colloidal silica | 10 | succinic acid | 1 | 31% aqueous solution |  |  |  |  |
| C. Ex. 11 | alumina | 15 | succinic acid | 1 | hydrogen peroxide | 5 | 0.73 | G | 3.6 |
|  | colloidal silica | 10 |  |  | 31% aqueous solution |  |  |  |  |
|  | fumed alumina | 2 |  |  |  |  |  |  |  |
| C. Ex. 12 | alumina | 15 | citric acid | 3 | hydrogen peroxide | 5 | 0.30 | NG | — |
|  |  |  | succinic acid | 1 | 31% aqueous solution |  |  |  |  |
|  | fumed alumina | 2 |  |  |  |  |  |  |  |
| C. Ex. 13 | alumina | 15 | citric acid | 3 | hydrogen peroxide | 5 | 0.83 | G | 3.9 |
|  | colloidal silica | 10 |  |  | 31% aqueous solution |  |  |  |  |
|  | fumed alumina | 2 |  |  |  |  |  |  |  |
| C. Ex. 14 | alumina | 15 | citric acid | 5 | hydrogen peroxide | 5 | 0.85 | G | 3.8 |
|  | colloidal silica | 10 |  |  | 31% aqueous solution |  |  |  |  |
|  | fumed alumina | 2 |  |  |  |  |  |  |  |
| C. Ex. 15 | alumina | 15 | citric acid | 3 | — |  | 0.83 | G | 3.6 |
|  | colloidal silica | 10 | succinic acid | 1 |  |  |  |  |  |
|  | fumed alumina | 2 |  |  |  |  |  |  |  |
| C. Ex. 16 | alumina | 15 | citric acid | 3 | hydrogen peroxide | 5 | 0.75 | G | 4 |
|  | colloidal silica | 10 | succinic acid | 1 | 31% aqueous solution |  |  |  |  |
|  | fumed silica | 2 |  |  |  |  |  |  |  |

TABLE 3

| | Abrasive [weight percentage] | | Organic acid [weight percentage] | | Oxidizing agent [weight percentage] | | Stock removal rate [μm/min] | Pits | Microwaviness [Å] |
|---|---|---|---|---|---|---|---|---|---|
| Ex. 23 | alumina | 15 | citric acid | 3 | hydrogen peroxide | 5 | 0.40 | G | 2.2 |
| | colloidal silica | 10 | succinic acid | 1 | 31% aqueous solution | | | | |
| | fumed alumina | 0.1 | | | | | | | |
| Ex. 24 | alumina | 15 | citric acid | 3 | hydrogen peroxide | 5 | 0.42 | G | 2.2 |
| | colloidal silica | 10 | succinic acid | 1 | 31% aqueous solution | | | | |
| | fumed alumina | 0.3 | | | | | | | |
| Ex. 25 | alumina | 15 | citric acid | 3 | hydrogen peroxide | 5 | 0.48 | G | 2.1 |
| | colloidal silica | 10 | succinic acid | 1 | 31% aqueous solution | | | | |
| | fumed alumina | 2 | | | | | | | |
| Ex. 26 | alumina | 15 | malic acid | 3 | hydrogen peroxide | 5 | 0.47 | G | 1.9 |
| | colloidal silica | 10 | succinic acid | 1 | 31% aqueous solution | | | | |
| | fumed alumina | 2 | | | | | | | |
| Ex. 27 | alumina | 15 | citric acid | 3 | hydrogen peroxide | 5 | 0.45 | G | 2.1 |
| | colloidal silica | 10 | iminodiacetic acid | 1 | 31% aqueous solution | | | | |
| | fumed alumina | 2 | | | | | | | |
| Ex. 28 | alumina | 15 | citric acid | 3 | hydrogen peroxide | 5 | 0.43 | G | 2.1 |
| | colloidal silica | 10 | itaconic acid | 1 | 31% aqueous solution | | | | |
| | fumed alumina | 2 | | | | | | | |
| Ex. 29 | alumina | 15 | citric acid | 3 | hydrogen peroxide | 5 | 0.42 | G | 2.2 |
| | colloidal silica | 10 | glycolic acid | 1 | 31% aqueous solution | | | | |
| | fumed alumina | 2 | | | | | | | |
| Ex. 30 | alumina | 15 | citric acid | 3 | hydrogen peroxide | 5 | 0.43 | G | 2.1 |
| | colloidal silica | 10 | malic acid | 1 | 31% aqueous solution | | | | |
| | fumed alumina | 2 | | | | | | | |
| Ex. 31 | alumina | 15 | citric acid | 1 | hydrogen peroxide | 5 | 0.40 | G | 2.1 |
| | colloidal silica | 10 | malic acid | 3 | 31% aqueous solution | | | | |
| | fumed alumina | 2 | | | | | | | |
| Ex. 32 | alumina | 15 | citric acid | 3 | iron nitrate | 5 | 0.40 | G | 2.2 |
| | colloidal silica | 10 | succinic acid | 1 | | | | | |
| | fumed alumina | 2 | | | | | | | |
| Ex. 33 | alumina | 15 | citric acid | 3 | peroxydisulfuric acid | 5 | 0.40 | G | 2.1 |
| | colloidal silica | 10 | succinic acid | 1 | | | | | |
| | fumed alumina | 2 | | | | | | | |
| C. Ex. 17 | alumina | 15 | citric acid | 3 | hydrogen peroxide | 5 | 0.35 | G | 2.5 |
| | colloidal silica | 10 | succinic acid | 1 | 31% aqueous solution | | | | |
| C. Ex. 18 | alumina | 15 | malic acid | 3 | hydrogen peroxide | 5 | 0.34 | G | 2.3 |
| | colloidal silica | 10 | succinic acid | 1 | 31% aqueous solution | | | | |
| C. Ex. 19 | alumina | 15 | succinic acid | 1 | hydrogen peroxide | 5 | 0.30 | G | 2.3 |
| | colloidal silica | 10 | | | 31% aqueous solution | | | | |
| | fumed alumina | 2 | | | | | | | |
| C. Ex. 20 | alumina | 15 | citric acid | 3 | hydrogen peroxide | 5 | 0.15 | NG | — |
| | fumed alumina | 2 | succinic acid | 1 | 31% aqueous solution | | | | |
| C. Ex. 21 | alumina | 15 | citric acid | 3 | hydrogen peroxide | 5 | 0.30 | G | 2.6 |
| | colloidal silica | 10 | | | 31% aqueous solution | | | | |
| | fumed alumina | 2 | | | | | | | |
| C. Ex. 22 | alumina | 15 | citric acid | 5 | hydrogen peroxide | 5 | 0.32 | G | 2.6 |
| | colloidal silica | 10 | | | 31% aqueous solution | | | | |
| | fumed alumina | 2 | | | | | | | |
| C. Ex. 23 | alumina | 15 | citric acid | 3 | — | — | 0.30 | G | 2.2 |
| | colloidal silica | 10 | succinic acid | 1 | | | | | |
| | fumed alumina | 2 | | | | | | | |
| C. Ex. 24 | alumina | 15 | citric acid | 3 | hydrogen peroxide | 5 | 0.31 | G | 2.2 |
| | colloidal silica | 10 | succinic acid | 1 | 31% aqueous solution | | | | |
| | fumed silica | 2 | | | | | | | |

As shown in Tables 1 to 3, broadly speaking, the stock removal rates based on the polishing compositions of Examples are larger than the stock removal rates based on the polishing compositions of Comparative Examples. Additionally, broadly speaking, the surface conditions of the substrates polished by use of the polishing compositions of Examples are better than the surface conditions of the substrates polished by use of the polishing compositions of Comparative Examples. Among others, in the cases of Examples 1 to 11 and Examples 23 to 33 where the mean particle size of alumina other than fumed alumina is 0.7 μm or less, the microwaviness magnitudes are notably reduced as compared with the corresponding Comparative Examples.

The present examples and embodiments are to be considered as illustrative and not restrictive and the invention is not to be limited to the details given herein, but may be modified within the scope and equivalence of the appended claims.

The invention claimed is:

1. A polishing composition comprising fumed alumina, alumina other than fumed alumina, colloidal silica, a first organic acid, a second organic acid, an oxidizing agent, and water, said first organic acid being citric acid or malic acid, wherein the mean primary particle size of the fumed alumina is smaller than the mean particle size of the alumina other than fumed alumina.

2. The polishing composition according to claim 1, wherein said second organic acid is succinic acid, iminodiacetic acid, itaconic acid, maleic acid, malonic acid, crotonic acid, gluconic acid, glycolic acid, lactic acid, or mandelic acid.

3. The polishing composition according to claim 2, wherein said second organic acid is succinic acid.

4. The polishing composition according to claim 2, wherein the content of the first organic acid in the polishing composition is 0.02% by weight or more and 3% by weight or less.

5. The polishing composition according to claim 2, wherein the content of the second organic acid in the polishing composition is 0.002% by weight or more and 2% by weight or less.

6. The polishing composition according to claim 1, wherein said first organic acid is citric acid and said second organic acid is malic acid.

7. The polishing composition according to claim 6, wherein the content of the first organic acid in the polishing composition is 0.02% by weight or more and 3% by weight or less.

8. The polishing composition according to claim 6, wherein the content of the second organic acid in the polishing composition is 0.02% by weight or more and 3% by weight or less.

9. The polishing composition according to claim 1, wherein the mean secondary particle size of fumed alumina is 1.5 µm or less.

10. The polishing composition according to claim 1, wherein the content of fumed alumina in the polishing composition is 0.02% by weight or more and 3% by weight or less.

11. The polishing composition according to claim 1, wherein the content of alumina other than fumed alumina in the polishing composition is 0.01% by weight or more and 8% by weight or less.

12. The polishing composition according to claim 1, wherein the mean particle size of colloidal silica is 10 nm or more and 200 nm or less.

13. The polishing composition according to claim 1, wherein the content of colloidal silica in the polishing composition is 0.2% by weight or more and 14% by weight or less.

14. The polishing composition according to claim 1, wherein the oxidizing agent comprises hydrogen peroxide, iron nitrate, aluminum nitrate, peroxodisulfuric acid, periodic acid, perchloric acid, or hypochlorous acid.

15. The polishing composition according to claim 1, wherein the content of the oxidizing agent in the polishing composition is 0.02% by weight or more and 12% by weight or less.

16. The polishing composition according to claim 1, wherein the polishing composition is used for polishing the surface of a substrate for a magnetic disk.

17. The polishing composition according to claim 1, wherein the mean primary particle size of fumed alumina is 5 nm or more and 0.1 µm or less and wherein the mean particle size of alumina other than fumed alumina is 0.2 µm or more and 1.2 µm or less.

18. The polishing composition according to claim 1, wherein said second organic acid is iminodiacetic acid, itaconic acid, crotonic acid, or mandelic acid.

19. The polishing composition according to claim 1, wherein the content of fumed alumina in the polishing composition is 0.1% by weight or more and 0.6% by weight or less, the content of alumina other than fumed alumina in the polishing composition is 0.2% by weight or more and 5% by weight or less, and the content of colloidal silica in the polishing composition is 1% by weight or more and 10% by weight or less.

20. The polishing composition according to claim 1, wherein the mean particle size of the colloidal silica is smaller than the mean particle size of the alumina other than fumed alumina.

* * * * *